United States Patent
Hung

[19]

[11] Patent Number: 5,901,056
[45] Date of Patent: May 4, 1999

[54] DC POWER SUPPLY DEVICE ADAPTED TO OPERATE WITH AN AC POWER SUPPLY OR WITH A CAR BATTERY VIA A CIGARETTE LIGHTER

[76] Inventor: Sheng-Chuan Hung, 3F, No. 328, Chukuang Road, Taipei, Taiwan

[21] Appl. No.: 08/984,374

[22] Filed: Dec. 3, 1997

[51] Int. Cl.[6] .............................. H02M 1/10; H02J 7/00
[52] U.S. Cl. ............................................. 363/142; 307/64
[58] Field of Search .............................. 363/37, 142, 144, 363/146; 307/64, 66

[56] References Cited

U.S. PATENT DOCUMENTS

| | | | |
|---|---|---|---|
| 4,860,185 | 8/1989 | Brewer et al. ............................. | 363/41 |
| 5,241,217 | 8/1993 | Severinsky ................................ | 307/64 |
| 5,245,220 | 9/1993 | Lee .......................................... | 307/80 |
| 5,347,211 | 9/1994 | Jakubowski .............................. | 323/351 |
| 5,465,011 | 11/1995 | Miller et al. .............................. | 307/64 |
| 5,694,307 | 12/1997 | Murugan ................................... | 363/37 |
| 5,744,934 | 4/1998 | Wu ........................................... | 320/111 |
| 5,764,504 | 6/1998 | Brand et al. .............................. | 363/144 |
| 5,793,627 | 8/1998 | Caldes et al. ............................. | 363/146 |

*Primary Examiner*—Adolf Danske Berhane
*Attorney, Agent, or Firm*—Pro-Techtor International Services

[57] ABSTRACT

A DC power supply device which includes a housing, an AC plug moved in and out of the housing and adapted to obtain AC power supply from a city power supply outlet, a DC plug moved in and out of the housing and adapted to obtain DC power supply from a socket for cigarette lighter of a car, a circuit board mounted inside the housing and adapted to process AC power supply obtained from the AC plug or DC power supply obtained from the DC plug into desired-DC power supply, and a DC output connector connected to the circuit board for DC output.

3 Claims, 7 Drawing Sheets

DC POWER SUPPLY DEVICE ADAPTED TO OPERATE WITH AN AC POWER SUPPLY OR WITH A CAR BATTERY VIA A CIGARETTE LIGHTER

BACKGROUND OF THE INVENTION

The present invention relates to a DC power supply device, and more particularly to a double usage DC power supply device which can be used indoors as well as in a car to convert city power supply or car battery power supply into desired DC power supply.

A notebook computer is equipped with a rechargeable battery. However, the battery can only provide the notebook computer with the necessary working voltage for a limited length of time. When the power of the battery is low, the notebook computer cannot function well, and a power supply device may be used. There are two known types of power supply devices, namely, the first type for connection to a city power supply outlet, and the second type for connection to a car battery power supply circuit. The first type is an AC to DC power inverter. The second type is a DC to AC power inverter. As illustrated in FIG. 1, the power supply device (AC to DC power inverter) 8 comprises a plug 81 for connection to a city power supply outlet to receive AC power supply from it, and a DC output connector 82 for connection to a power input connector of a notebook computer to provide it with desired DC power supply. A DC to AC power inverter cannot be directly connected to a notebook computer, and must be used with an AC to DC power inverter. As illustrated in FIG. 2, the power supply device (DC to AC power inverter) 9 comprises a plug 91 for connection to a socket for cigarette lighter of a car to obtain DC power supply from it, and a socket 92 which receives the plug 81 of the power supply device (AC to DC power inverter) 8 to provide it with AC power supply, permitting AC power supply to be converted into DC power supply and then sent to the notebook computer which is connected to the DC output connector 82 of the power supply device (AC to DC power inverter) 8. It is inconvenient to carry these two types of power supply devices for use with a notebook computer in a car.

SUMMARY OF THE INVENTION

According to one aspect of the present invention, the DC power supply device comprises a housing, an AC plug adapted to obtain AC power supply from a city power supply outlet, a DC plug adapted to obtain DC power supply from a socket for cigarette lighter of a car, a circuit board mounted inside the housing and adapted to process AC power supply obtained from the AC plug or DC power supply obtained from the DC plug into desired DC power supply, and a DC output connector connected to the circuit board for DC output. According to another aspect of the present invention, the AC plug and the DC plug are respectively moved in and out of the housing between the operative position and the non-operative position. According to still another aspect of the present invention, the housing has a wire groove around the periphery adapted to receive the cable of the DC output connector, and a receiving chamber adapted to receive the DC output connector.

DETAILED DESCRIPTION OF THE PREFERRED EMBODIMENT

Figure 1:
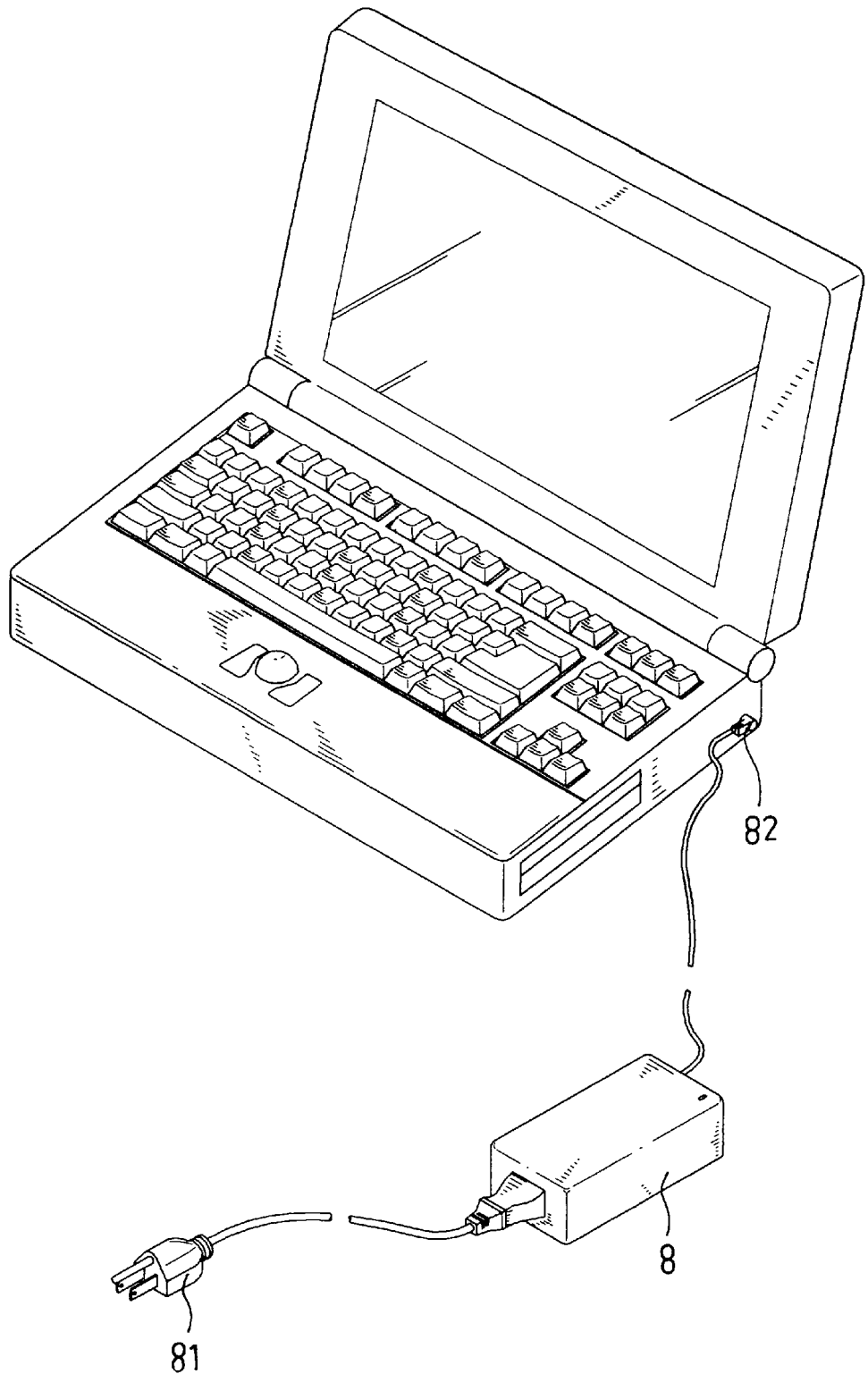
FIG. 1 shows an AC to DC power inverter connected to a notebook computer according to the prior art.
Figure 2:
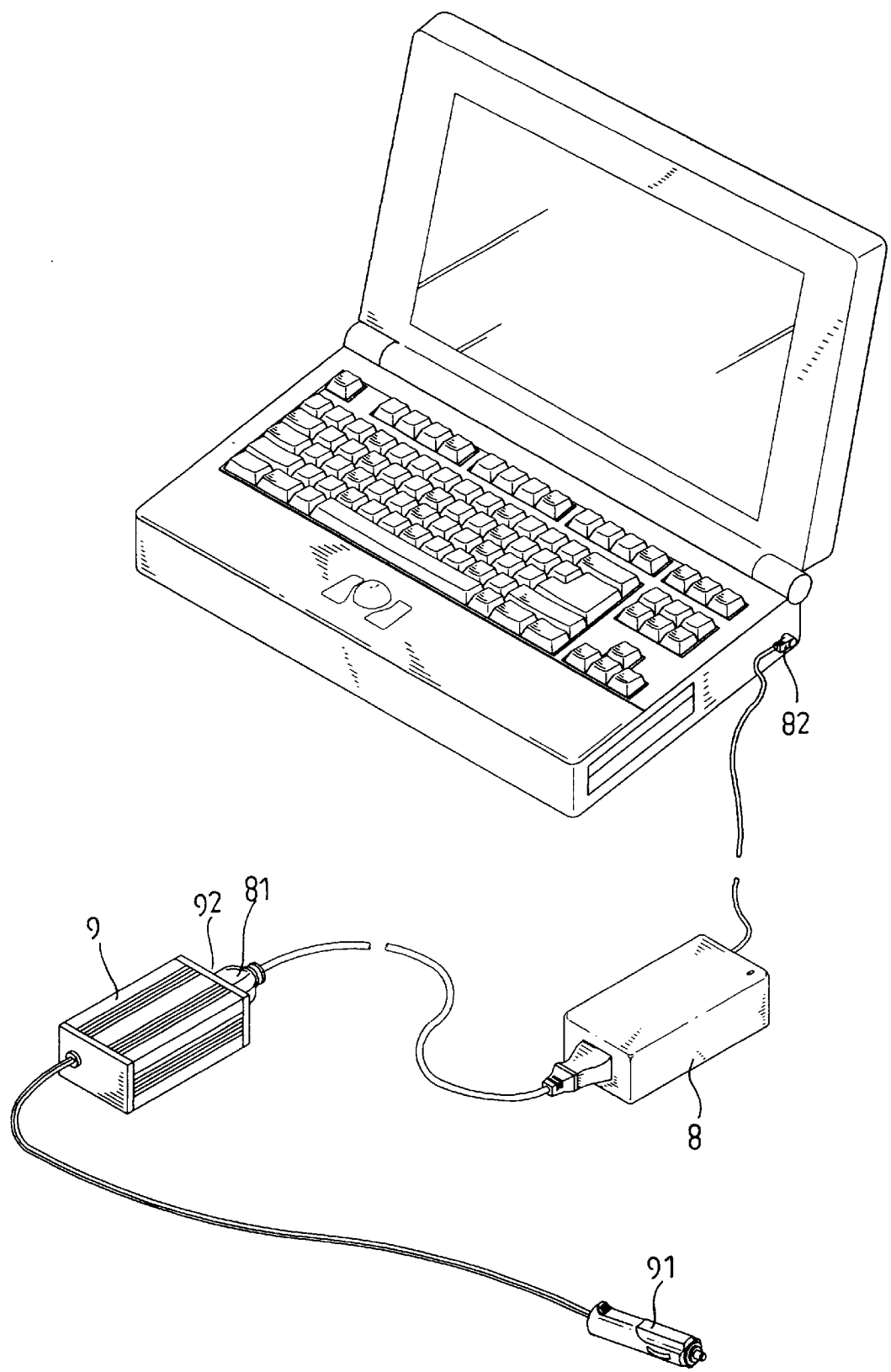
FIG. 2 shows a DC to AC power inverter connected between an AC to DC power inverter and a notebook computer according to the prior art.

Referring to FIGS, 3 to 6, a DC power supply device 10 is shown comprised of a housing 1, a circuit board 3 (see also FIG. 12), an AC plug 5, and a DC plug 7. The circuit board 3 comprises a first EMI (electromagnetic interference) filter 31, a HV (high voltage) rectifier 32, a HV (high voltage) power switching converter 33, a second EMI (electromagnetic interference) filter 34, a DC to AC converter 35, a main transformer 36, a rectifier circuit 37, a feed back circuit 39, a PWM (pulse width modulation) control 41, and a ripple and RFI (radio frequency interference) filter 42. The AC plug 5 is provided for connection to a city power supply outlet to obtain AC power supply, permitting input AC (110 V or 220 V) power supply to be processed through the first EMI filter 31, the HV rectifier 32 and the HV power switching converter 33 and then transmitted to the main transformer 36. The DC plug 7 is provided for connection to a socket for cigarette lighter of a car to obtain DC power supply from it, permitting input DC power supply (DC12 V) to be processed through the second EMI filter 34 and the DC to AC converter 35 and then transmitted to the main transformer 36. The main transformer 36 drops the voltage of input AC/DC power supply, then sends it to a DC output connector 44 through a cable 43 via the rectifier circuit 37 and the RFI filter 42. When the main transformer 36 sends processed power supply to the DC output connector 44, the feedback circuit 39 sends a feedback signal to the PWM control 41 and the DC to AC converter 35, causing the HV power switching converter 33 and the DC to AC converter 35 to be controlled, and therefore the voltage is stabilized. DC power can then be sent from the DC output connector 44 to, for example, a notebook computer.

Figure 6:
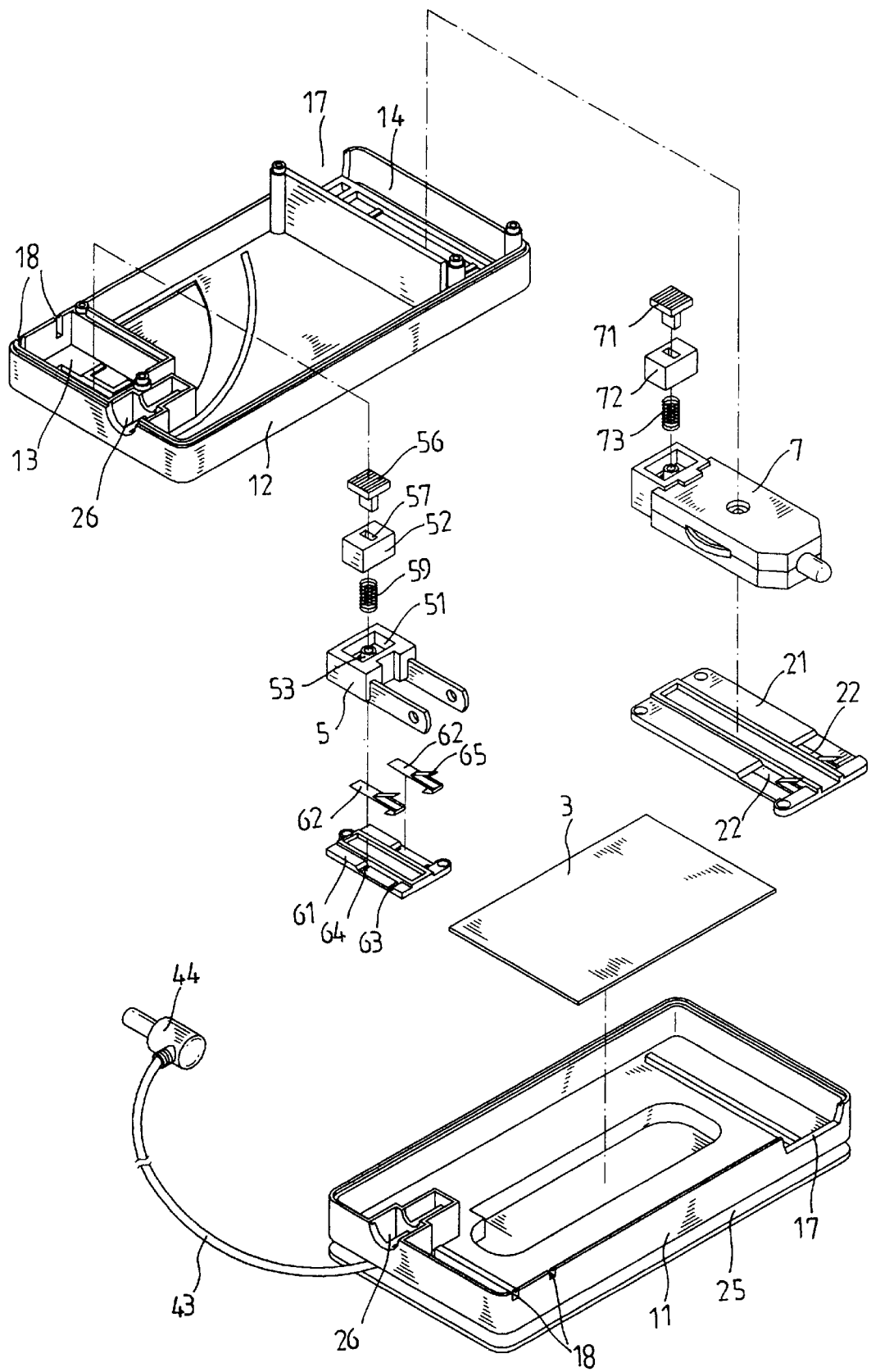
FIG. 6 is an exploded view of the DC power supply device according to the present invention.
Figure 7:
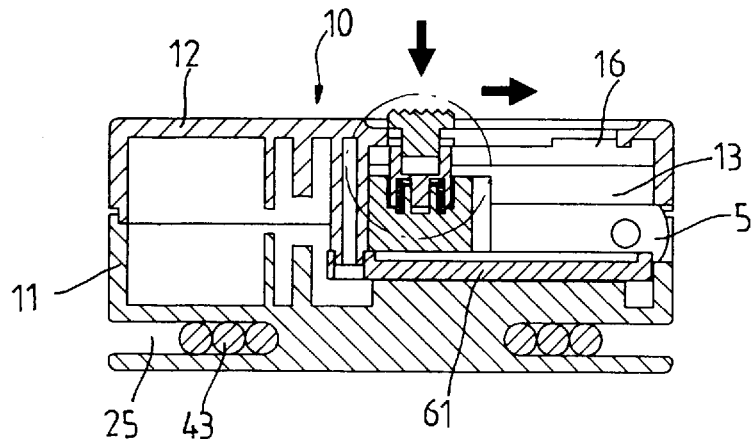
FIG. 7 is a sectional view taken along line 7—7 of FIG. 3.
Figure 9:
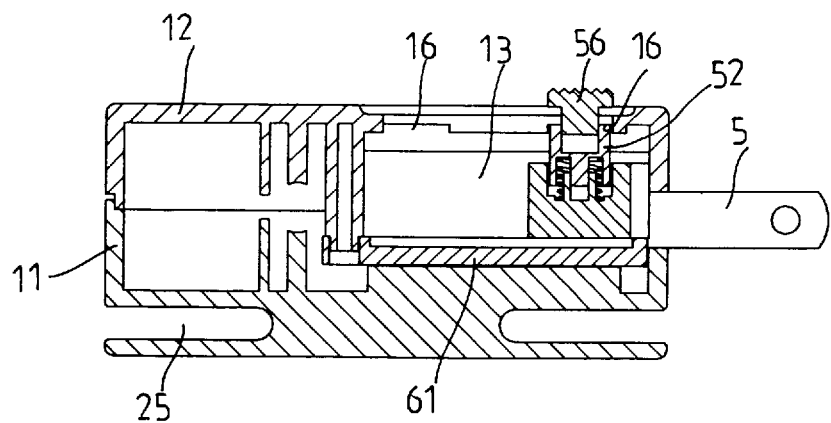
FIG. 9 is a sectional view taken along line 9—9 of FIG. 4.

Referring to FIGS. 7 and 9 and FIGS. 4 and 6 again, the housing 1 is comprised of a bottom shell 11, and a top cover shell 12. The top cover shell 12 is covered on the bottom shell 11, and then sealed thereto by an ultrasonic sealing apparatus. The top cover shell 12 comprises a first transverse sliding chamber 13 in a left corner thereof which receives the AC plug 5, and a lid 61 covered on the first transverse sliding chamber 13. The lid 61 comprises a pair of hook holes 63 and a pair of through holes 64. Two hooked terminals 62 are respectively fastened to the hook holes 63 on the lid 61, and extended out of the through holes 64 for connection to two opposite terminals of the circuit board 3 by an electric wire. The hooked terminals 62 have a projecting spring strip 65 respectively forced into contact with a respective contact at the AC plug 5. The AC plug 5 is mounted in the first transverse sliding chamber 13, and moved between the operative position where the blades of the AC plug 5 are respectively extended out of a respective slot 18 on the top cover shell 12 for connection to a city power supply outlet (see FIGS. 4 and 9), and the nonoperative position where the blades of the AC plug 5 are received inside the first transverse sliding chamber 13 (see FIG. 7). When the blades of the AC plug 5 is extended out of the respective slots 18 on the top cover shell 12 and connected to a city power supply outlet, AC power supply is transmitted through the terminals 62 to the circuit board 3, and then processed into desired DC power supply.

Figure 3:
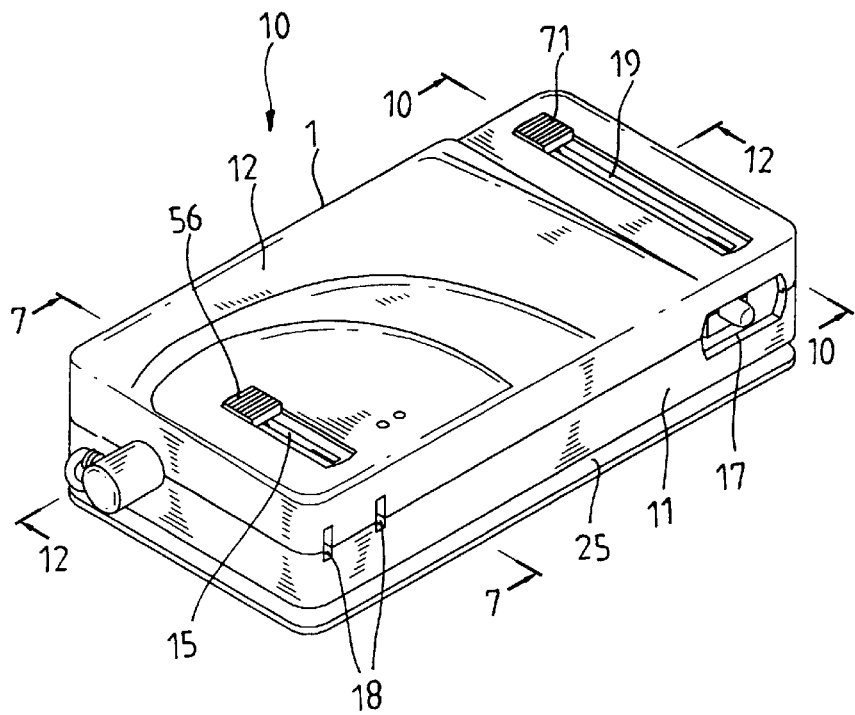
FIG. 3 is a perspective view of a DC power supply device according to the present invention, showing the AC plug, the DC plug and the DC output connector received inside the housing.
Figure 8:
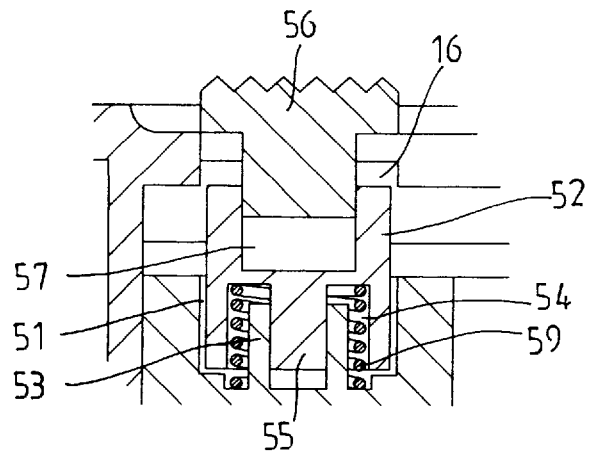
FIG. 8 is an enlarged view of a part of FIG. 7.

Referring to FIGS. from 3 to 9 again, the AC plug 5 comprises an open chamber 51, an upright tube 53 disposed at the center of the open chamber 51, a block 52 mounted in the open chamber 51, a compression spring 59 mounted around the upright tube 53 inside the open chamber 51 and imparting an upward pressure to the block 52, and a T-shaped slide 56 coupled to the block 52 and moved along a transverse sliding slot 15 on the top cover shell 12 to shift the AC plug 5 between the operative position (see FIGS. 4 and 9) and the non-operative position (see FIGS. 3 and 7). The block 52 comprises a bottom hole 54 which receives the compression spring 59, a downward plug rod 55 disposed in the bottom hole 54 and fitted into the upright tube 53, and a top mounting hole 57 which receives the T-shaped slide 56 (see FIG. 8). Two recessed holes 16 are formed inside the top cover shell 12 at two opposite ends of the transverse sliding slot 15. When the AC plug 5 is moved to the operative position or non-operative position, the block 52 is forced upwards by the compression spring 59 into engagement with one recessed hole 16 (see FIG. 9), and therefore the AC plug 5 is retained in position. When the T-shaped slide 56 is depressed, the block 52 is lowered and disengaged from the recessed hole 16 at one end of the transverse sliding slot 15 (see FIGS. 7 and 8), and therefore the AC plug 5 is allowed to be shifted between the operative position and the non-operative position.

Figure 4:
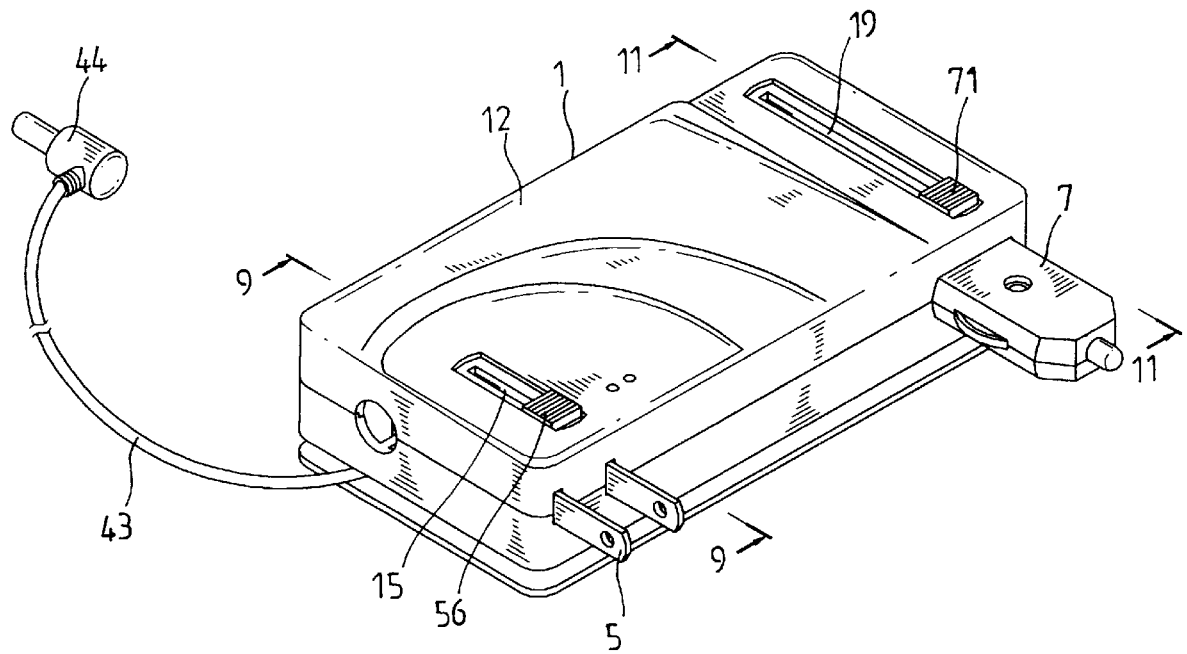
FIG. 4 is another perspective view of the present invention, showing the AC plug, the DC plug and the DC output connector extended out of the housing.
Figure 5:
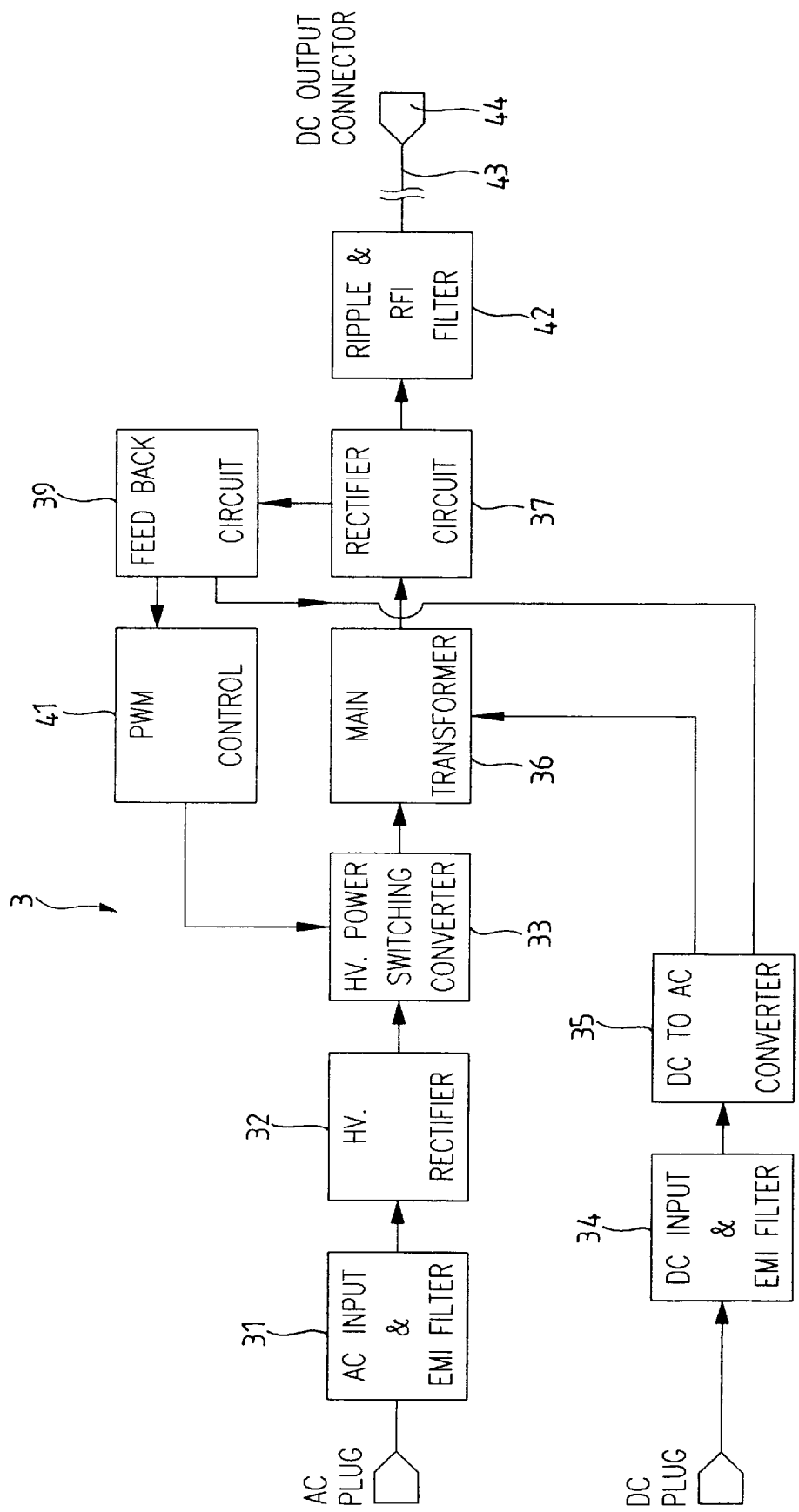
FIG. 5 is a circuit block diagram of the circuit board according to the present invention.
Figure 10:
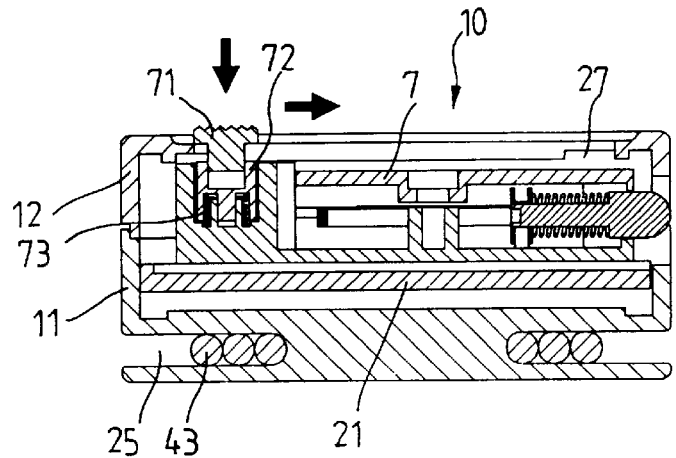
FIG. 10 is a sectional view taken along line 10—10 of FIG. 3.
Figure 11:
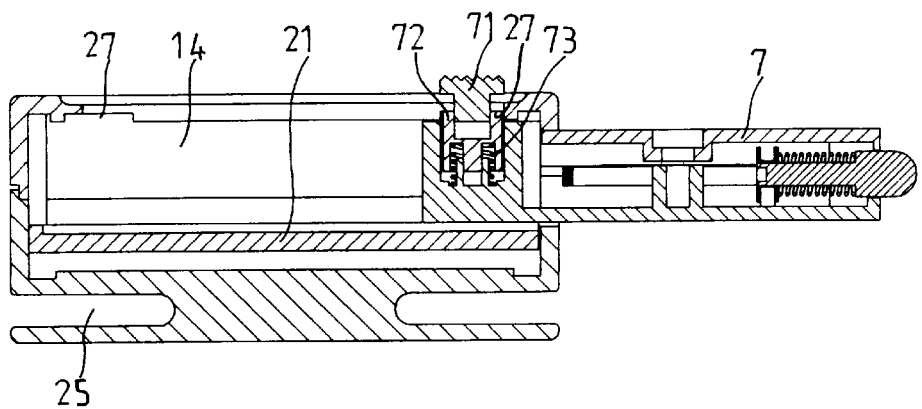
FIG. 11 is a sectional view taken along line 11—11 of FIG. 4.

Referring to FIGS from 10 and 11 and FIGS. 3, 4 and 6 again, the top cover shell 12 further comprises a second transverse sliding chamber 14 at a rear side thereof remote from the first transverse sliding chamber 13. The second transverse sliding chamber 14 is covered with a lid 21. The DC plug 7 is mounted in the second transverse sliding chamber 14, and moved in and out of a side opening 17 on the housing 1. FIGS. 4 and 11 show the DC plug 7 extended out of the side opening 17. FIGS. 3 and 10 show the DC plug 7 received inside the second transverse sliding chamber 14. The lid 21 is provided with two terminals 22. The terminals 22 are disposed in contact with the DC plug 7, and respectively connected to two opposite terminals of the circuit board 3 by an electric wire. Similar to the AC plug 5, the DC plug 7 comprises a block 72, a compression spring 73, and a T-shaped slide 71. The T-shaped slide 71 is coupled to the block 72, and moved along a transverse sliding slot 19 on the top cover shell 12 to shift the DC plug 7 between the operative position and the non-operative position. The compression spring 73 imparts an upward pressure to the block 72. Two recessed holes 27 are made inside the top cover shell 12 at two opposite ends of the transverse sliding slot 19. When the DC plug 7 is shifted to the operative position or non-operative position, the block 72 is forced upwards by the compression spring 73 into engagement with one recessed hole 27, and therefore the DC plug 7 is retained in position. When the T-shaped slide 71 is depressed, the block 72 is lowered and disengaged from the recessed hole 27 at one end of the transverse sliding slot 19, and therefore the DC plug 7 is allowed to be shifted between the operative position and the non-operative position.

Figure 12:
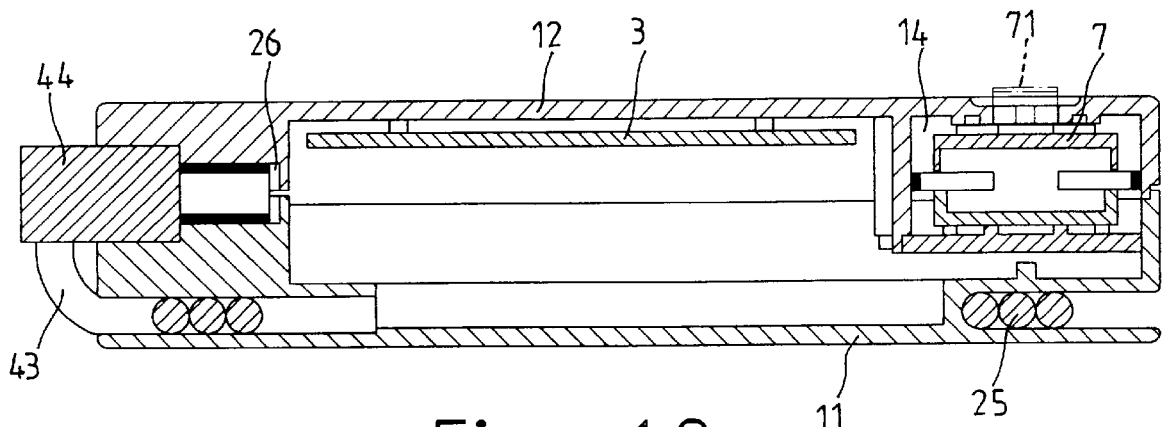
FIG. 12 is a sectional view taken along line 12—12 of FIG. 3.

Referring to FIGS. 6, 7 and 12, the housing 1 further comprises a wire groove 25 around the periphery adapted to receive the cable 43, and a connector chamber 26 adapted to receive the DC output connector 44.

While only one embodiment of the present invention has been shown and described, it will be understood that various modifications and changes could be made there unto without departing from the spirit and scope of the invention disclosed.

What the invention claimed is:

1. A DC power supply device comprising:
 a housing, said housing comprising a bottom shell and a top cover shell covered on said bottom shell;
 a circuit board mounted inside said housing, said circuit board comprising a first EMI (electromagnetic interference) filter, a HV (high voltage) rectifier, a HV (high voltage) power switching converter, a second EMI (electromagnetic interference) filter, a DC to AC converter, a main transformer, a rectifier circuit, a feed back circuit, a PWM (pulse width modulation) control, and a ripple and RFI (radio frequency interference) filter;
 an AC plug mounted in said housing and moved between a first position where said AC plug is extended out of said housing for connection to a city power supply outlet to obtain AC power supply from it, and a second position where said AC plug is received inside said housing;
 a DC plug mounted in said housing and moved between a first position where said DC plug is extended out of said housing for connection to a socket for cigarette lighter of a car to obtain DC power supply from it, and a second position where said DC plug is received inside said housing; and
 a DC output connector connected to said main transformer by a cable;
 wherein input AC power supply obtained from said AC plug is processed through said first EMI filter, said HV rectifier and said HV power switching converter and then transmitted to said main transformer for converting into the desired DC power supply; input DC power supply obtained from said DC plug is processed through said second EMI filter and said DC to AC converter and then transmitted to said main transformer for converting into the desired DC power supply; said main transformer drops the voltage of input AC/DC power supply, then sends it to said DC output connector through said cable via said rectifier circuit and said RFI filter; said feed back circuit sends a feed back signal to said PWM control and said DC to AC converter when said main transformer sends processed power supply to said DC output connector, causing said HV power switching converter/said DC to AC converter to stabilize the voltage, and wherein
 said housing comprises a first transverse sliding slot, two first recessed holes inside said top cover shell at two opposite ends of said first transverse sliding slot, a second transverse sliding slot, and two second recessed holes inside said top cover shell at two opposite ends of said second transverse sliding slot; said AC plug comprises an open chamber, a block mounted in the open chamber on said AC plug, a T-shaped slide coupled to the block of said AC plug and moved along said first transverse sliding slot between said two first recessed holes, and a compression spring mounted in the open chamber on said AC plug and imparting an upward pressure to the block of said AC plug, the block of said AC plug being forced into engagement with one first recessed hole to hold said AC plug in position when said AC plug is moved to the first or second position; said DC plug comprises an open chamber, a block mounted in the open chamber on said DC plug, a T-shaped slide coupled to the block of said DC plug and moved along said second transverse sliding slot between said two second recessed holes, and a compression spring mounted in the open chamber on said DC plug and imparting an upward pressure to the block of said DC plug, the block of said DC plug being forced by the corresponding compression spring into engagement with one second recessed hole to hold said DC plug in position when said DC plug is moved to the first or second position.

2. The DC power supply device of claim 1, wherein said housing comprises a wire groove around the periphery adapted to receive said cable of said DC output connector.

3. The DC power supply device of claim 1, wherein said housing comprises a connector chamber adapted to receive said DC output connector.

* * * * *